United States Patent [19]
Laffont

[11] Patent Number: 5,345,603
[45] Date of Patent: Sep. 6, 1994

[54] RECEIVER ARRANGEMENT FORMED BY A PLURALITY OF RECEIVE BRANCHES

[75] Inventor: Jean Laffont, Bois D'Arcy, France

[73] Assignee: U.S. Philips Corporation, New York, N.Y.

[21] Appl. No.: 790,940

[22] Filed: Nov. 12, 1991

[30] Foreign Application Priority Data

Nov. 13, 1990 [FR] France .................. 9014037

[51] Int. Cl.$^5$ ............................. H04B 7/08
[52] U.S. Cl. ..................... 455/139; 455/273; 455/276.1
[58] Field of Search ........... 455/132, 137, 138, 139, 455/147, 272, 273, 276.1, 275; 375/100

[56] References Cited

U.S. PATENT DOCUMENTS

| 4,326,294 | 4/1982 | Okamoto et al. ........ | 455/276.1 |
| 4,593,413 | 6/1986 | Ozaki ..................... | 455/139 |
| 5,204,979 | 4/1993 | Schenkyr et al. ........ | 455/139 |

FOREIGN PATENT DOCUMENTS

| 0600321 | 6/1960 | Canada ................... | 455/273 |
| 0125537 | 8/1982 | Japan .................... | 455/137 |
| 0117522 | 5/1988 | Japan .................... | 455/137 |
| 0143720 | 6/1990 | Japan .................... | 455/132 |
| 0295233 | 12/1990 | Japan .................... | 455/139 |

Primary Examiner—Reinhard J. Eisenzope
Assistant Examiner—Nguyen Vo
Attorney, Agent, or Firm—Jack D. Slobod

[57] ABSTRACT

This arrangement is formed by two receive branches (1) and (4) for receiving a wave whose frequency spectrum is practically constant in a predetermined frequency band, a combining circuit (15) for combining the waves at the output of the receive branches and a servo-control for keeping the spectrum of the signal at the output of the combining circuit constant by adjusting a phase shifting circuit (12) inserted in said branch (4). The servo-control is constituted by a frequency discrimination circuit (25) for analyzing the combined waves, an adjustable selective circuit (27) for obtaining a frequency band of the spectrum of the combined signal as a function of the output signal of the frequency discriminator and by a control circuit (29, 31) which adjusts the phase shifting circuit for optimizing the output signal of the selective circuit.

4 Claims, 2 Drawing Sheets

RECEIVER ARRANGEMENT FORMED BY A PLURALITY OF RECEIVE BRANCHES

BACKGROUND OF THE INVENTION

1. Field of the Invention

The present invention relates to a receiver arrangement comprising at least two receive branches for receiving a wave whose frequency spectrum is practically constant in a predetermined frequency band, a combining circuit for producing a first combined signal by combining the waves at the output of the receive branches and a servo-control for adjusting a phase shifting circuit inserted in one of the branches for maintaining the spectrum of an output signal representing a combination of the waves of the two branches constant at the output of said arrangement, said servo-control comprising a frequency discriminating circuit for analyzing combined signals, an adjustable selective circuit for obtaining a frequency band of a combined signal as a function of the output signal of said discriminator and a control circuit for adjusting the phase shifting circuit so as to maximize the output signal of the selective circuit.

Such an invention finds important applications in space-diversity receive systems, more specifically, for microwave links. In this domain it has appeared essential to use means for combatting selective distortion effects which are caused by propagation. One of these means consists of appropriately combining the signals received from the same transmitter through two different aerials (space-diversity). The most widely-known way of acting consists of performing this operation with intermediate frequency. The two intermediate frequency signals are conveniently phase shifted and attenuated or amplified relative to each other so that the signal resulting from their summation (called combined signal) presents sufficient features for satisfying the conditions for a correct transmission. It has been known and proved that the combined signal can be and is in most cases better than the individual signals received by each of the branches. This is particularly noticeable in the case where one or the two received signals is or are affected by distortions due to a selective (frequency) propagation phenomenon. In effect, it is easy to show and verify that when the receive aerials are sufficiently interspaced (space-diversity) or directed according to different angles of incidence (angular diversity), the respectively received signals present uncorrelated distortions for which a convenient line combination is sufficient to restore a much less distorted and usable signal.

It is known to adjust the phase shifting circuit for augmenting the overall level (power maximization).

A more particular servo-control criterion is described in Japanese Patent Application No. 56-98035. In this Application the spectrum of the combined signal is analyzed and the phase shifting circuit is adjusted for equalizing the spectrum.

The servo-control consists of using a power maximizing arrangement of the power measured in a band of the combined signal spectrum which presents the least energy. Worded differently, it is supposed that the ideal spectrum presents a known envelope (feature of pseudo-random digital transmissions often used in microwave links) and that any difference relative to this envelope (distortion) is associated to a point of minimum energy in the band. This principle thus seems to belong to a criterion for band distortion minimization. In fact it has been proved and experimented that all prior-art digital signal demodulation systems are all the more sensitive to distortion if the total signal-to-noise ratio deteriorates, or worded differently, if the criterion of minimization of the distortions plays a leading part over the maximization of the power when distortions occur in the useful band.

SUMMARY OF THE INVENTION

It is also particularly important to observe that when the distortions disappear (return to normal propagation conditions) the arrangement according to the invention ipso facto regains the behaviour of a power maximizing system even if this is measured in a reduced passband. In effect, it can easily be demonstrated that in the absence of distortion the maximization of the power measured in a reduced passband leads to the same conditions as those obtained when measuring the power in a passband forming the signal.

This method is thus inseparable from that permitting controlling a power measuring filter in an autoadaptive way, constantly centred on the particular frequency of the spectrum that presents the least energy relative to the nominal shape of said ideal spectrum. An advantage provided by the arrangement is that any notion of threshold that may exist sometimes in the state of the art is not used, at which threshold a criterion of power maximization is servo-controlled to that of distortion minimization and vice versa.

The arrangement described in the Japanese Patent Application has the disadvantage that one of the branches comprises a phase modulator. The phase modulator causes disturbances of the output signal of the combining circuit.

The present invention proposes an arrangement of the type mentioned in the preamble in which disturbances of the output signal are avoided.

Therefore, such an arrangement is characterized in that the phase shift in the other branch is constant.

The invention is based on the idea that it is not necessary to use a phase modulator in one of the two branches but that it is possible to realise an optimum combination of signals of the two branches only with the remaining prior-art means.

BRIEF DESCRIPTION OF THE DRAWING

The following description, accompanied with appended drawings all given by way of non-limiting example will make it better understood how the invention may be realised, in which.

DETAILED DESCRIPTION OF THE PREFERRED EMBODIMENTS

Figure 1:
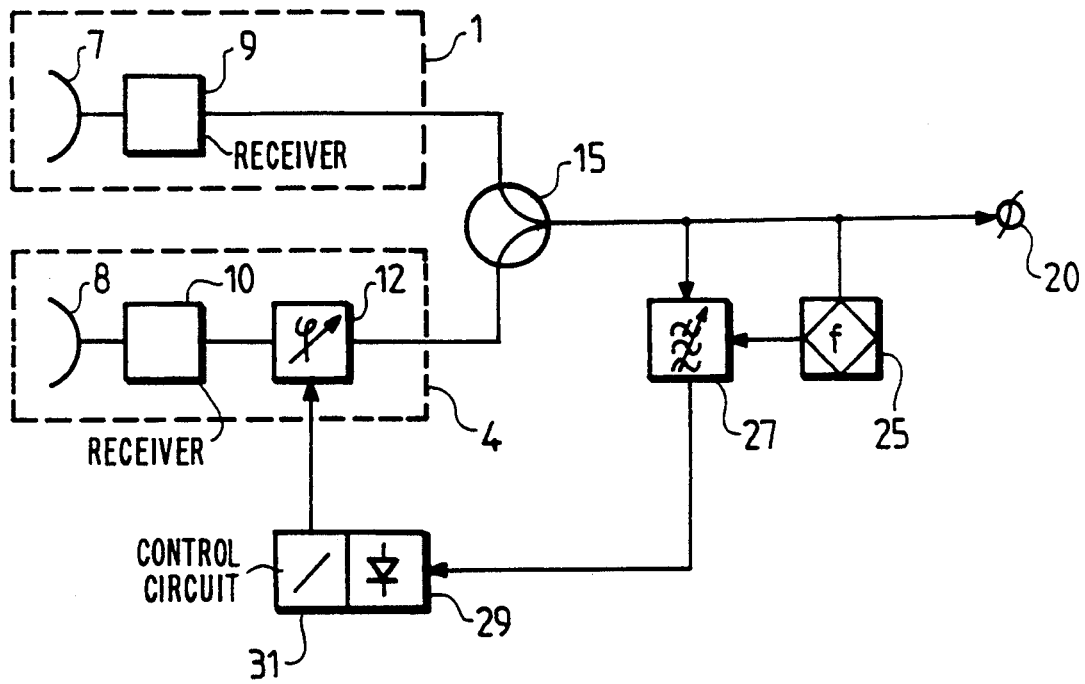
FIG. 1 shows an arrangement according to the invention.
Figure 2A:
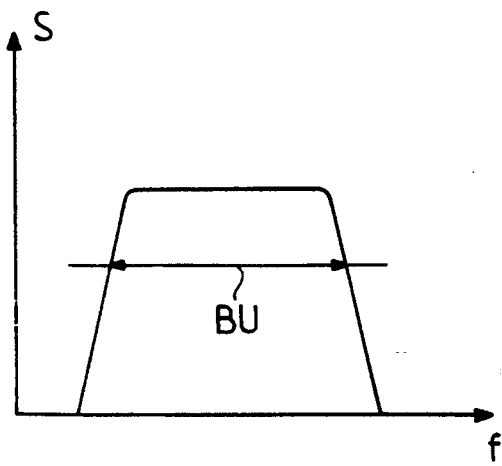
FIG. 2a shows the spectrum of the transmitted signal.

The arrangement according to the invention shown in FIG. 1 comprises two receive branches 1 and 4. Each branch comprises a receive aerial 7, 8 for receiving a wave of several GHz used for transmitting digital pseudo-randomly coded data and thus, this wave presents a fiat S spectrum in a given passband BU as will be shown in FIG. 2a.

For each of these branches a receiver 9 and 10, amplifying these waves and transposing them to an intermediate frequency, are connected to these aerials. In one of the branches, branch 4, a phase shifting circuit 12 is inserted. The output signals of these branches are superposed by means of, for example, a hybrid circuit 15 which thus constitutes a combining circuit. The superimposed signals can access a terminal 20 for an additional process which does not form part of the invention.

Figure 2B:
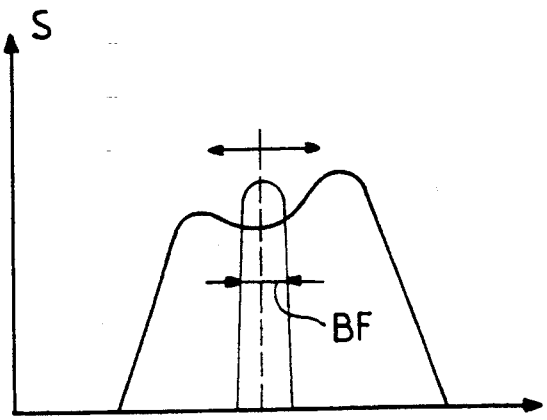
FIG. 2b shows the spectrum of the deformed signal and the shape of the passband of the selective circuit.

In conformity with the invention, in order to maintain a flat spectrum of the received data, a servo-control is provided formed by a frequency discriminator 25 for analyzing the spectrum of the combined signal, a selective filter 27 at least the center frequency of which can be adjusted (as indicated by the arrows in FIG. 2b) by the output signal of the discriminator for tapping a part of width BF (see FIG. 2b) of the spectrum of the combined signal. A level measuring circuit 29, 31 adjusts the phase shifting circuit 12 as a function of the level of the output signal of filter 27. The circuit 29, 31 is formed by an envelope detector 29 and a control circuit 31 which produces the voltage for controlling the phase shifter 12.

For realising the phase shifting circuit reference may be made to FIG. 10 of the article by A. RICAGNI and T. TESTI, entitled: "IF COMBINING TECHNIQUES FOR SPACE-DIVERSITY IN ANALOG AND DIGITAL RADIO SYSTEM", published in IEEE International Conference on Communications, 13/17 June 1982—PHILADELPHIA, pp. 4B. 6. 1. to 4B. 6. 5.

The discriminator may be an integrated circuit model, for example, the circuit manufactured by PLESSEY registered SL 1454.

Figure 3:
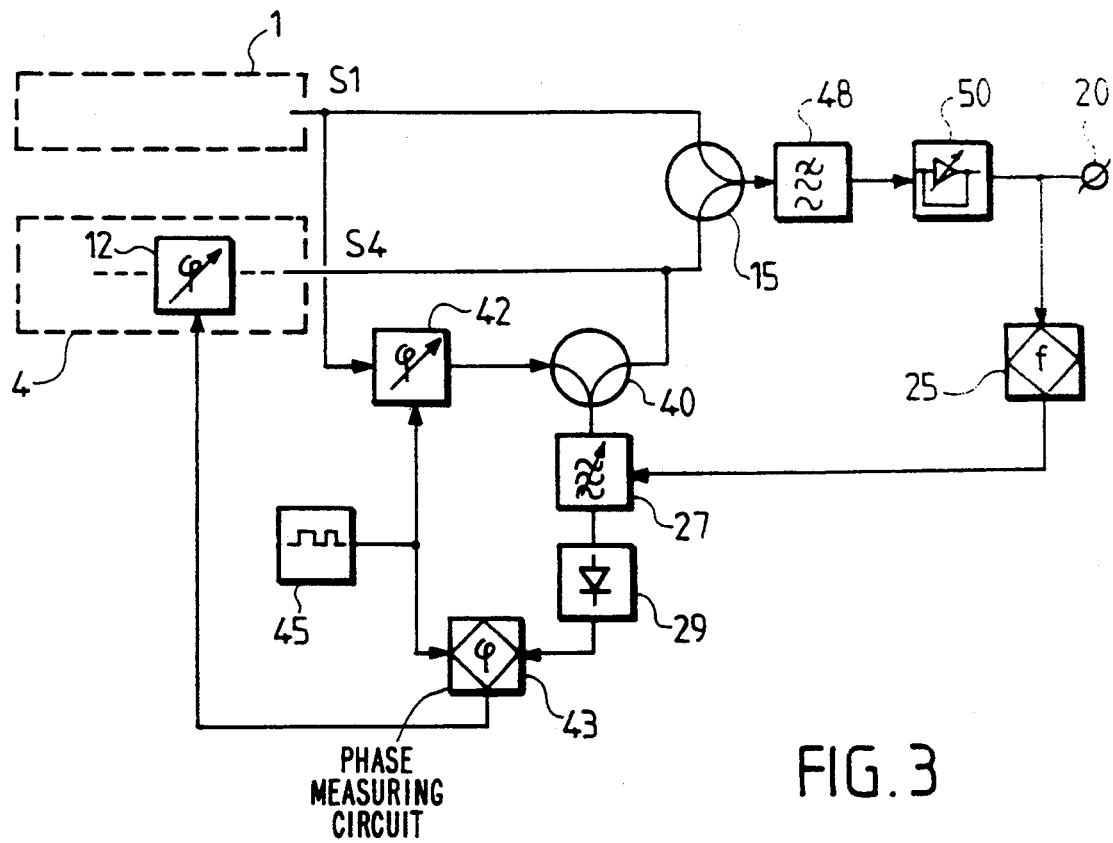
FIG. 3 shows a preferred embodiment of an arrangement according to the invention.

FIG. 3 shows a preferred embodiment of an arrangement according to the invention. The elements used in common with FIG. 1 have the same reference numerals.

The arrangement shown in FIG. 3 comprises, in addition to the elements of the arrangement shown in FIG. 1, a second combining circuit 40 for combining the output signals of branch 1 which axe phase-shifted at a low frequency and to a small extent by a phase modulator 42, and also the output signals of branch 4.

The input of the selective filter 27 is connected to the output of this circuit 40 and its control input receives the signal from the discriminator 25, always connected at terminal 20, the envelope detector 29 measures the level of the output signal of the filter 27 and its measured signal is applied to a phase measuring circuit 43 receiving a reference signal from an oscillator 45 and also controlling the phase shifting circuit modulator 42. The output signal of this phase-shifted measuring circuit is applied to the phase shifting circuit 12. Auxiliary circuits axe inserted between the output of the combining circuit 15 and the terminal 20, a band-pass filter 48 and an amplitude control circuit 50 in order to improve the quality of the signal.

Figure 4:
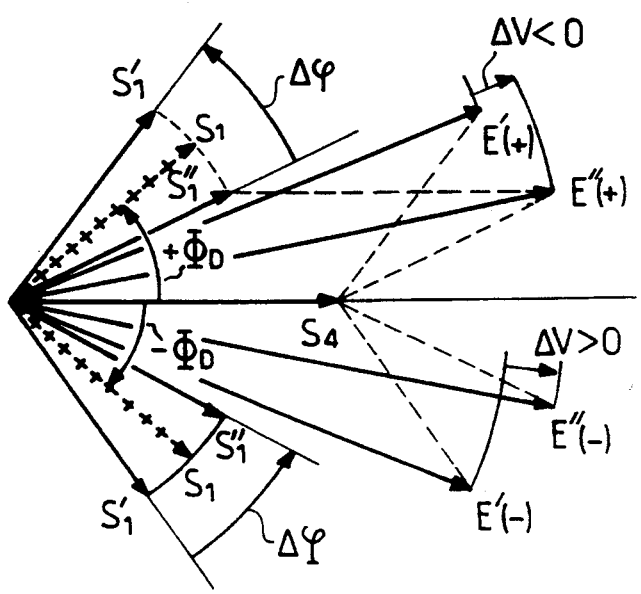
FIG. 4 shows the vectorial composition of the signals present in the structure of the arrangement of FIG. 3.

The operation of such an arrangement is the following. Reference is made to FIG. 4.

Let $\Delta l$ be the amplitude of the phase modulation provided by the phase modulator 42 and $\phi_D$ the phase shift of the output signal S4 of the branch 4.

The output signal S1 of the branch B1 will assume two positions S'1 and S"1 if the vectorial representation of FIG. 4 is considered where the reference phase is given by the output signal S4 of the branch 4.

Two cases produced by the phase shift of S1 relative to S4 axe envisaged.

First case: the phase shift is positive and equal to $+\phi_D$, the composition of the signal S4 with S"1 provides the signal E"(+) and that of the signal with S'1 provides E'(−). It will be found that E"(+)>E'(−) thus that the amplitude of the signal reduces $\Delta V$.

Second case: the phase shift is negative and equal to $+\phi_D$, when applying the same compositions the signals E"(−) and E'(−) will be obtained and it will be found that E'(−)<E'(−) and that $\Delta V$ is positive.

From this follows that for a phase shift of $\phi_D$ there is a signal modulation which is in phase opposition, which produces at the output of circuit 43 a signal whose sign is capable of controlling the phase shifting circuit 12.

The arrangement according to the invention may be improved by adjusting the amplitude of the signals at the outputs of each branch in order to make them equal. This may be effected by a variable gain amplifier which forms part of the receive branches.

I claim:

1. A receiver arrangement comprising at least first and second receive branches for receiving a wave whose frequency spectrum is practically constant in a predetermined frequency band, a phase shifting circuit inserted in the second receive branch, the first receive branch having a constant phase shift, a first combining circuit connected to outputs of the first and second receive branches for producing a first combined signal by combining the waves at the outputs of the first and second receive branches, a phase modulator connected to the output of the first receive branch; a second combining circuit connected to outputs of the phase modulator and the second receive branch for producing a second combined signal by combining the waves at the outputs of the phase modulator and the second branch, an oscillation circuit connected to the phase modulator for adjusting a phase shift introduced by the phase modulator, a frequency discriminator coupled to an output of the first combining circuit for analyzing said first combined signal, an adjustable selective circuit coupled to the frequency discriminator and an output of the second combining circuit for obtaining a frequency band of the second combined signal as a function of an output signal of said discriminator, an envelope detector connected to an output of the selective circuit, and a phase measuring circuit connected to outputs of the oscillation circuit and the envelope detector and to a control input of said phase shifting circuit for measuring a phase difference between signals at the outputs of the oscillation circuit and the envelope detector and for adjusting the phase shifting circuit as a function of the measured phase difference.

2. A receiver arrangement as claimed in claim 1, characterized in that an output signal of the receiver is tapped from the output of said first combining circuit.

3. Receiver arrangement as claimed in claim 1, characterized in that the frequency discriminator circuit is of the type having a single output port.

4. A receiver arrangement as claimed in claim 2, characterized in that the frequency discriminator is of a type having a single output port.

* * * * *